United States Patent
Pettersson

(10) Patent No.: US 12,000,690 B2
(45) Date of Patent: Jun. 4, 2024

(54) CABLE-BASED MEASURING SYSTEM

(71) Applicant: PACKSIZE LLC, Salt Lake City, UT (US)

(72) Inventor: Niklas Pettersson, Vasteras (SE)

(73) Assignee: PACKSIZE, LLC, Salt Lake City, UT (US)

(*) Notice: Subject to any disclaimer, the term of this patent is extended or adjusted under 35 U.S.C. 154(b) by 111 days.

(21) Appl. No.: 17/232,896

(22) Filed: Apr. 16, 2021

(65) Prior Publication Data

US 2021/0231430 A1 Jul. 29, 2021

Related U.S. Application Data

(62) Division of application No. 16/353,929, filed on Mar. 14, 2019, now Pat. No. 11,022,425, which is a
(Continued)

(51) Int. Cl.
*G01B 11/04* (2006.01)
*B65B 57/12* (2006.01)
(Continued)

(52) U.S. Cl.
CPC ............ *G01B 11/043* (2013.01); *B65B 57/12* (2013.01); *G01B 3/11* (2013.01); *G01B 5/0021* (2013.01);
(Continued)

(58) Field of Classification Search
CPC ... G01D 5/02; G01D 5/26; G01B 5/02; G01B 5/0021; G01B 7/02; G01B 21/02;
(Continued)

(56) References Cited

U.S. PATENT DOCUMENTS 4,893,074 A 1/1990 Holt et al.
4,977,524 A 12/1990 Strege et al.
(Continued)

FOREIGN PATENT DOCUMENTS

EP 1671763 A1 6/2006
WO 00/63637 A1 10/2000
(Continued)

OTHER PUBLICATIONS

Final Office Action received for U.S. Appl. No. 15/340,839, dated Sep. 27, 2018.
(Continued)

*Primary Examiner* — Sang H Nguyen
(74) *Attorney, Agent, or Firm* — Quarles & Brady LLP

(57) ABSTRACT

The present disclosure extends to methods, systems, apparatus, and computer program products related to a cable-based measuring system. The cable-based measuring system includes a cable, comprising an inner cable member configured to move linearly within an outer cable housing. The measuring system also includes a measuring device configured to generate measurement information regarding movement of the inner cable member relative to the outer cable housing using one or more encoders. A computer system receives the measurement information from the measuring device. The measurement information indicates length as a function of time, and represents three orthogonal dimensional measurements of a three-dimensional object. Based on the measurement information, the computer system identifies a length of each dimensional measurement, including a length, a width, and a height of the three-dimensional object. The computer system then initiates creation of a box template sized to accommodate the three-dimensional object and/or updates a database.

19 Claims, 7 Drawing Sheets

Related U.S. Application Data division of application No. 15/340,839, filed on Nov. 1, 2016, now Pat. No. 10,281,260, which is a division of application No. 14/370,741, filed as application No. PCT/US2012/070659 on Dec. 19, 2012, now Pat. No. 9,541,422.

(60) Provisional application No. 61/587,013, filed on Jan. 16, 2012, provisional application No. 61/584,588, filed on Jan. 9, 2012.

(51) Int. Cl.
| | |
|---|---|
| *G01B 3/11* | (2006.01) |
| *G01B 5/00* | (2006.01) |
| *G01B 5/02* | (2006.01) |
| *G01B 7/02* | (2006.01) |
| *G01B 21/02* | (2006.01) |
| *G01D 5/02* | (2006.01) |
| *G01D 5/26* | (2006.01) |

(52) U.S. Cl.
CPC ............... *G01B 5/02* (2013.01); *G01B 7/02* (2013.01); *G01B 21/02* (2013.01); *G01D 5/02* (2013.01); *G01D 5/26* (2013.01); *B65B 2210/04* (2013.01); *G01B 2210/58* (2013.01)

(58) Field of Classification Search
CPC .... G01B 3/11; G01B 11/043; G01B 2210/58; B65B 57/12; B65B 2210/04
See application file for complete search history.

(56) References Cited

U.S. PATENT DOCUMENTS

| | | | |
|---|---|---|---|
| 5,042,015 | A | 8/1991 | Stringer |
| 5,770,864 | A | 6/1998 | Dlugos |
| 5,867,019 | A | 2/1999 | Malenko et al. |
| 5,948,024 | A | 9/1999 | O'Mahony et al. |
| 6,658,755 | B2 | 12/2003 | Arlinsky |
| 6,663,153 | B2 | 12/2003 | Brunson |
| 6,775,639 | B1 | 8/2004 | Mason |
| 6,785,973 | B1 | 9/2004 | Janssen |
| 6,840,898 | B2 | 1/2005 | Pettersson |
| 6,928,029 | B2 | 8/2005 | Rickman |
| 7,403,900 | B2 | 7/2008 | Cooper et al. |
| 7,602,505 | B2 | 10/2009 | Kaltenbach |
| 7,882,772 | B2 | 2/2011 | Wise |
| 8,131,654 | B2 | 3/2012 | Asano et al. |
| 8,356,419 | B2 | 1/2013 | Lord |
| 9,541,422 | B2 | 1/2017 | Pettersson |
| 9,651,363 | B2 | 5/2017 | Gao et al. |
| 2002/0091310 | A1* | 7/2002 | Jentsch ............... A61B 5/413 128/903 |
| 2007/0121096 | A1 | 5/2007 | Giger et al. |
| 2008/0020916 | A1 | 1/2008 | Magnell |
| 2008/0072443 | A1 | 3/2008 | Powell |
| 2008/0104855 | A1 | 5/2008 | Kim et al. |
| 2009/0313844 | A1 | 12/2009 | Swanson et al. |
| 2010/0135550 | A1* | 6/2010 | Arnon ............... A61B 5/015 382/128 |
| 2010/0208769 | A1 | 8/2010 | Martin et al. |
| 2010/0259474 | A1* | 10/2010 | Hildreth ............... G06F 3/0304 715/771 |
| 2010/0275456 | A1 | 11/2010 | Lord |
| 2011/0061962 | A1 | 3/2011 | Sy et al. |
| 2011/0301730 | A1* | 12/2011 | Kemp ............... H04M 1/60 700/94 |
| 2012/0206339 | A1* | 8/2012 | Dahl ............... G06F 3/0325 345/156 |
| 2012/0313900 | A1* | 12/2012 | Dahl ............... G01S 5/18 345/177 |
| 2013/0000252 | A1 | 1/2013 | Pettersson et al. |
| 2013/0050080 | A1* | 2/2013 | Dahl ............... G01S 5/30 345/173 |
| 2013/0102324 | A1* | 4/2013 | Qiu ............... G01S 5/0284 455/456.1 |
| 2013/0232804 | A1 | 9/2013 | Teune et al. |
| 2014/0021940 | A1 | 1/2014 | Hong |
| 2014/0059981 | A1 | 3/2014 | Pettersson |
| 2014/0101948 | A1 | 4/2014 | Lee et al. |
| 2014/0352164 | A1 | 12/2014 | Goldstein |
| 2015/0077765 | A1 | 3/2015 | Pettersson |
| 2015/0369579 | A1 | 12/2015 | Mathis |
| 2016/0040971 | A1 | 2/2016 | Hoge |
| 2017/0045351 | A1 | 2/2017 | Pettersson |
| 2019/0212127 | A1 | 7/2019 | Pettersson |

FOREIGN PATENT DOCUMENTS

| | | |
|---|---|---|
| WO | 2006/115350 A1 | 11/2006 |
| WO | 2013/106177 A1 | 7/2013 |

OTHER PUBLICATIONS

International Search Report and Written Opinion for PCT/US2012/070659 dated Mar. 11, 2013.
Non-Final Office Action received for U.S. Appl. No. 16/353,929, dated Jul. 9, 2020, 12 pages.
Non-Final Office Action received for U.S. Appl. No. 16/353,929, dated Nov. 19, 2020, 15 pages.
Office Action received for U.S. Appl. No. 14/370,741, dated Apr. 21, 2016.
Office Action received for U.S. Appl. No. 15/340,839, dated Apr. 18, 2018.

* cited by examiner

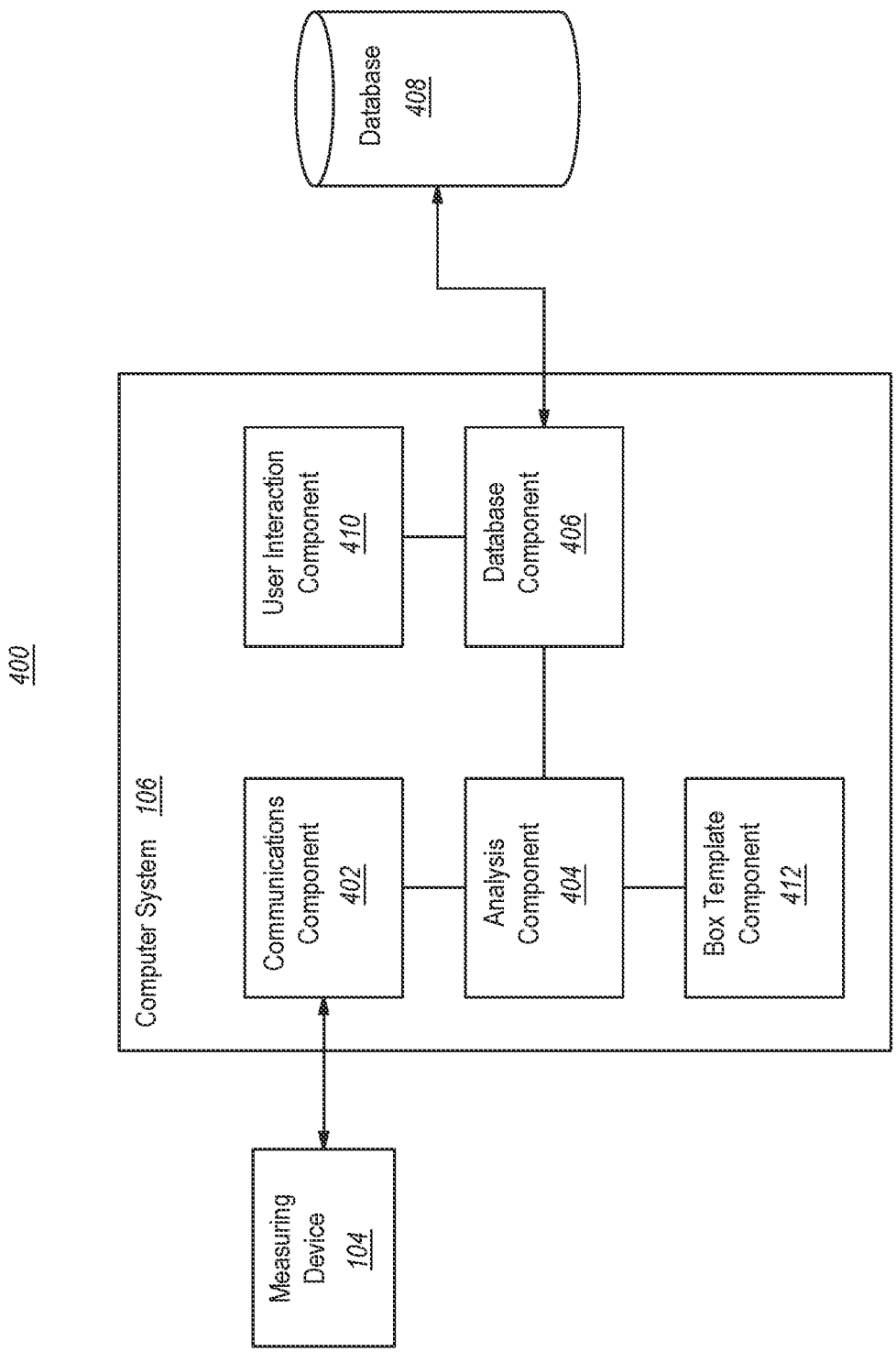

CABLE-BASED MEASURING SYSTEM

This application is a divisional of U.S. patent application Ser. No. 16/353,929, filed Mar. 14, 2019, and entitled "CABLE-BASED MEASURING SYSTEM", which is a divisional of U.S. patent application Ser. No. 15/340,839, filed Nov. 1, 2016, and entitled "CABLE-BASED MEASURING SYSTEM", now U.S. Pat. No. 10,281,260, issued May 7, 2019, which is a divisional of U.S. patent application Ser. No. 14/370,741, filed Jul. 3, 2014, and entitled "CABLE-BASED MEASURING SYSTEM", now U.S. Pat. No. 9,541,422, issued Jan. 10, 2017, which claims priority to and the benefit of PCT Application No. PCT/US2012/070659, filed Dec. 19, 2012, and entitled "CABLE-BASED MEASURING SYSTEM", which claims the benefit of and priority to the following applications: U.S. Provisional Application No. 61/587,013, filed Jan. 16, 2012, and entitled "CABLE-BASED MEASURING SYSTEM" and U.S. Provisional Application No. 61/584,588, filed Jan. 9, 2012, and entitled "CABLE-BASED MEASURING SYSTEM". All the aforementioned applications and patents are incorporated by reference herein in their entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually.

Computer systems have been applied to the field of shipping, packaging, and fulfillment. In particular, computer systems are now used to manage inventory information related to items that are to be packaged (e.g., item dimensions), and to generate custom-sized box templates based on the inventory information.

Shipping and packaging industries frequently use paperboard and other processing equipment that converts raw material (e.g., fanfold materials) into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 40% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Customized sized boxes also reduce the shipping costs associated with shipping items compared to shipping the items in oversized boxes. A shipping vehicle filled with boxes that are 40% larger than the packaged items is much less cost efficient to operate than a shipping vehicle filled with boxes that are custom sized to fit the packaged items. In other words, a shipping vehicle filled with custom sized packages can carry a significantly larger number of oversized packages, which can reduce the number of shipping vehicles required to ship that same number of items. Accordingly, in addition or as an alternative to calculating shipping prices based on the weight of a package, shipping prices are often affected by the size of the shipped package. Thus, reducing the size of an item's package can reduce the price of shipping the item.

While generating custom-sized boxes based on inventory information has clear advantages, creating the inventory information (including dimensional information) can be a tedious process. Typically, a worker measures the dimensions of an object with a ruler or measuring tape and then enters the measurement information at a computer system. Manual measurement and data entry processes are prone to human error (e.g., errors in reading measurement data, errors in entering measurement data), and can be time-consuming and costly.

BRIEF SUMMARY

The present invention extends to methods, systems, apparatus, and computer program products for a cable-based measuring system. The cable-based measuring system is a component of an on-demand material processing system that converts raw materials (e.g., fanfold materials) into physical box templates. As such, the cable-based measuring system can obtain measurements for an item to be packaged, and communicate those measurements to material processing equipment for creation of an appropriately-sized box template.

In some embodiments, a cable-based measuring system includes a cable. The cable comprises an inner cable member positioned within an outer cable housing. The inner cable member is configured to move linearly within the outer cable housing. The cable-based measuring system also includes a measuring device. The measuring device is configured to generate measurement information regarding movement of the inner cable member relative to the outer cable housing. A computer system is configured to initiate creation of a box template and/or update an item database. When initiating creation of a box template, the computer system receives the measurement information from the measuring device and then initiates creation of a box template based on the measurement information. When updating the item database, the computer system updates an item database containing dimensional information for one or more physical items.

In other embodiments, a measuring device includes one or more encoders. The encoder(s) are configured to detect movement of an inner cable member relative to an outer cable member. The encoder(s) are also configured to generate measurement information relating to movement of the inner cable member relative to the outer cable member. The measuring device also includes a communications mechanism, which is configured to communicate the measurement information to a computer system. Based on receipt of the measurement information, the computer system is configured to initiate creation of a box template and/or update a database.

In still other embodiments, a method for identifying three-dimensional object measurements includes a computer system receiving measurement data. The measurement data indicates length as a function of time, and represents at least three orthogonal dimensional measurements corresponding to dimensions of a three-dimensional object or group of objects. Based on the measurement data, the computer system identifies a length of each dimensional measurement, including a length, a width, and a height of the three-dimensional object/group of objects. The computer system then (i) initiates creation of a physical box template from raw material, the physical box template being configured to be erected into a box sized to accommodate the three-dimensional object/group of objects, and/or (ii) updates a database, including creating an item entry for the three-dimensional object in the database or updating an item entry for the three-dimensional object in the database.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an exemplary computing environment that facilitates identifying three-dimensional object measurements.

DETAILED DESCRIPTION

Figure 1A:
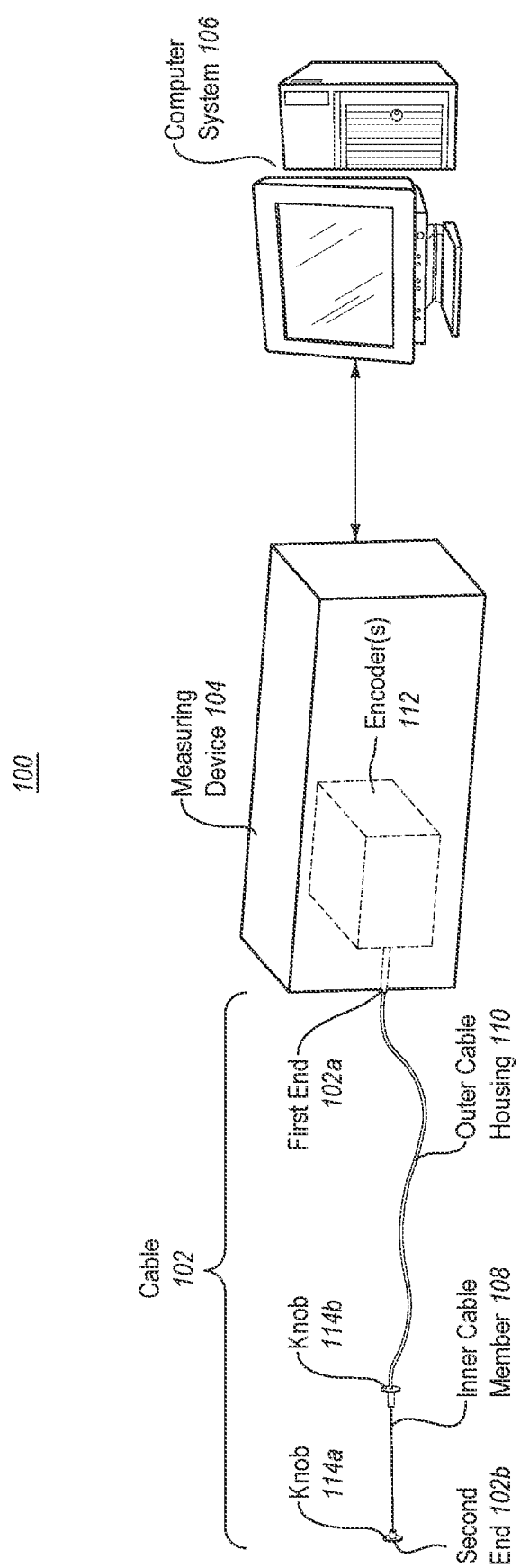
FIG. 1A illustrates a cable-based measuring system that facilitates measurement of dimensions of three-dimensional objects.

The present invention extends to methods, systems, apparatus, and computer program products for a cable-based measuring system. The cable-based measuring system is a component of an on-demand material processing system that converts raw materials (e.g., fanfold materials) into physical box templates. As such, the cable-based measuring system can obtain measurements for an item to be packaged, and communicate those measurements to material processing equipment for creation of an appropriately-sized box template.

In some embodiments, a cable-based measuring system includes a cable. The cable comprises an inner cable member positioned within an outer cable housing. The inner cable member is configured to move linearly within the outer cable housing. The cable-based measuring system also includes a measuring device. The measuring device is configured to generate measurement information regarding movement of the inner cable member relative to the outer cable housing. A computer system is configured to initiate creation of a box template and/or update an item database. When initiating creation of a box template, the computer system receives the measurement information from the measuring device and then initiates creation of a box template based on the measurement information. When updating the item database, the computer system updates an item database containing dimensional information for one or more physical items.

In other embodiments, a measuring device includes one or more encoders. The encoder(s) are configured to detect movement of an inner cable member relative to an outer cable member. The encoder(s) are also configured to generate measurement information relating to movement of the inner cable member relative to the outer cable member. The measuring device also includes a communications mechanism, which is configured to communicate the measurement information to a computer system. Based on the measurement information, the computer system is configured to initiate creation of a box template and/or update a database.

In still other embodiments, a method for identifying three-dimensional object measurements includes a computer system receiving measurement data. The measurement data indicates length as a function of time, and represents at least three orthogonal dimensional measurements corresponding to dimensions of a three-dimensional object or group of objects. Based on the measurement data, the computer system identifies a length of each dimensional measurement, including a length, a width, and a height of the three-dimensional object/group of objects. The computer system then (i) initiates creation of a physical box template from raw material, the physical box template being configured to be erected into a box sized to accommodate the three-dimensional object/group of objects, and/or (ii) updates a database, including creating an item entry for the three-dimensional object in the database or updating an item entry for the three-dimensional object in the database.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an exemplary cable-based measuring system 100 that facilitates measurement of dimensions of three-dimensional objects. Referring to FIG. 1A, cable-based measuring system 100 includes cable 102, measuring device 104 (or control box), and computer system 106. Measuring device 104 and computer system 106 may be incorporated into a single device or system, or may be connected to one another via a hard-wired and/or wireless communications mechanism. Accordingly, measuring device 104 and computer system 106 can create and exchange message related data with one another and possibly with other computer systems or devices.

Cable 102 comprises any mechanism which enables movement of one member relative to another member and which enables measurement of the length of the movement of the members relative to one another. As depicted, for example, cable 102 comprises inner cable member 108, which is positioned at least partially within outer cable housing 110. Inner cable member 108 is configured to move linearly within outer cable housing 110. Generally, inner cable member 108 has a length exceeding a length of outer cable housing 110, enabling inner cable member 108 to extend beyond outer cable housing 110 at one or both ends of outer cable housing 110.

According to some embodiments, inner cable member 108 and outer cable housing 110 are substantially rigid along a linear direction of cable 102 and are configured to transmit mechanical force by movement of inner cable member 108 relative to outer cable housing 110. For example, cable 102 may comprise a Bowden-type cable (e.g., a cable type which is often used as part of braking and/or gear shifting systems on bicycles). In such embodiments, movement (in either linear direction) of inner cable member 108 relative to outer cable housing 110 at one end of cable 102 translates to a corresponding movement of inner cable member 108 relative to outer cable housing 110 at the opposing end of cable 102. In some embodiments, outer cable housing 110 may comprise a multi-layer housing which may include one or more of: an outer coating (e.g., plastic and/or rubber), a rigid support structure (e.g., steel), and/or a friction-reduction layer (e.g., plastic). In some embodiments, inner cable member may comprise a single material (e.g., steel). In other embodiments, cable 102 (including both inner cable member 108 and outer cable housing 110) may be comprised of a single material, such as plastic.

According to other embodiments, inner cable member 108 is substantially flexible compared to outer cable housing 110. For example, inner cable member 108 may comprise a string or rope made of natural or synthetic fibers, and may pass through a relatively rigid outer cable housing 110 (e.g., a plastic outer cable housing). Thus, inner cable member 108 can be configured to be pulled through outer cable housing 110 at one end of cable 102, and to generate a corresponding movement of inner cable member 108 relative to outer cable housing 110 at an opposing end of cable 102.

As depicted, first end 102a of cable 102 interfaces with measuring device 104. Measuring device 104 is configured to detect movement of inner cable member 108 relative to outer cable housing 110 using encoder(s) 112. In some embodiments, for example, a first end of outer cable housing 110 (corresponding to first end 102a of cable 102) is attached to measuring device 104 in a stationary manner that enables movement of inner cable member 108 relative to outer cable housing 110 through encoder(s) 112. In some embodiments, a first end of inner cable member 108 (also corresponding to first end 102a of cable 102) is attached to a return mechanism, which is configured to apply a force to inner cable member 108. The applied force is configured to draw inner cable member 108 toward measuring device 104, as discussed in more detail later in connection with at least FIGS. 3A-3B.

Opposing second end 102b of cable 102 is configured to be usable for measuring object dimensions. In particular, second end 102b of cable 102 is configured to enable a corresponding second end of inner cable member 108 to be pulled away from a corresponding second end of outer cable housing 110. As depicted, cable 102 may comprise a plurality of measurement knobs, such as knob 114a attached to the second end of inner cable member 108 and knob 114a attached to the second end of outer cable housing 110. Knobs 114a/114a provide mechanisms for gripping the second end of inner cable member 108 and the second end of outer cable housing 110, and provide reference points for measurement. Thus, using knobs 114a/114b, a user is enabled to pull the second end of inner cable member 108 from the second end of outer cable housing 110 and to position knobs 114a/114b at the outer boundaries of a dimension to be measured. As the user does so, the first end of inner cable member 108 moves relative to the first end of outer cable housing 110 at measuring device 104, and this movement is measured using encoder(s) 112.

Figure 1B:
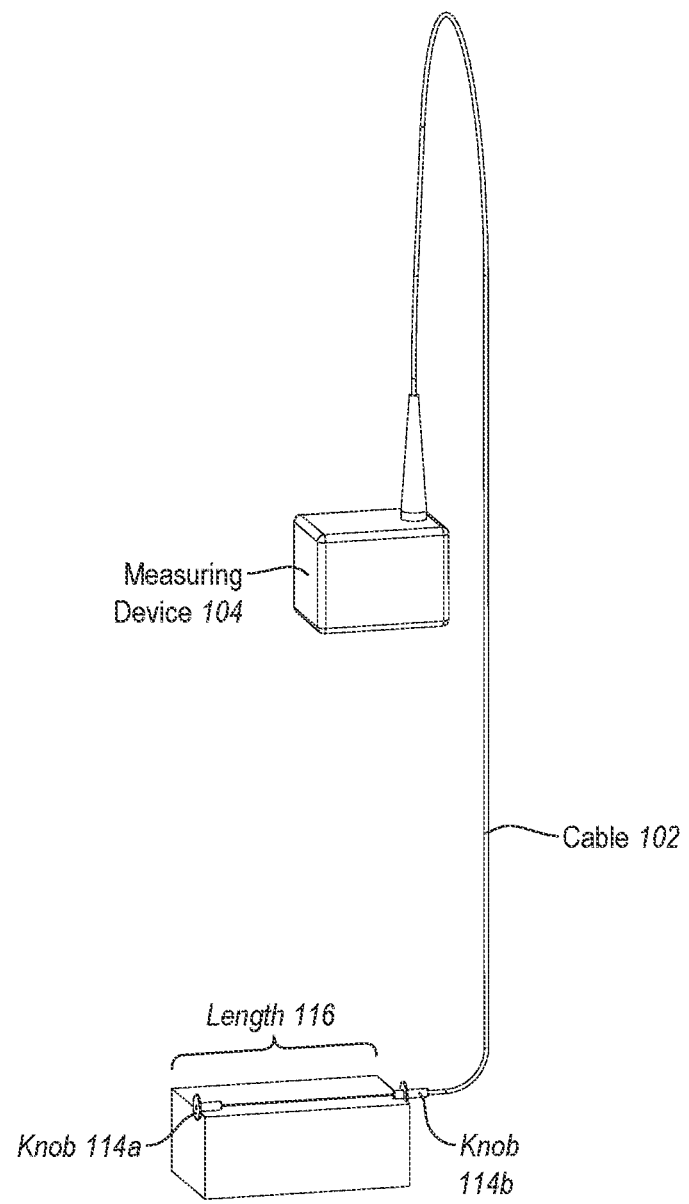
FIG. 1B illustrates a measuring device and cable being used to measure a dimension of a three-dimensional object.

FIG. 1B illustrates measuring device 104 and cable 102 being used to measure a dimension of a three-dimensional object. As depicted, at second end 102a of cable 102 a user has pulled knob 114a (which is attached to the second end of inner cable member 108) away from knob 114b (which is attached to the second end of outer cable housing 110). As a result, length 116 of inner cable member 108 has been pulled out of outer cable housing 110. A corresponding length of inner cable member 108 (not shown) has also been pulled into outer cable housing 110 at first end 102a of cable 102 (corresponding to measuring device 104). Movement of the corresponding length of inner cable member 108 is detected by encoder(s) 112.

Encoders(s) 112 can comprise any combination of one or more devices configured to record movement of inner cable member 108 relative to outer cable housing 110 at first end 102a of cable 102 (corresponding to measuring device 104). For example, encoders(s) 112 can include one or more optical encoding devices or sensors which detect movement of inner cable member 108 using light, such as by detecting changes in color and/or brightness, by use of one or more laser(s), etc. Additionally or alternatively, encoders(s) 112 can include one or more mechanical encoders which detect movement of inner cable member 108 using mechanical means, such as through use of gears, pins, pulleys, spools, etc.

Generally, encoders(s) 112 are configured to convert detected movement of inner cable member 108 into a computer-understandable format, such as an analog or digital signal, packet data, etc. In some embodiments, for example, encoders(s) 112 are configured to generate a series of electronic pulses. Each electronic pulse may indicate a particular length of movement of inner cable member 108 relative to outer cable housing 110, a distance of rotation of a spool, pulley, or gear, or any other appropriate measurement. Encoders(s) 112 may also generate directional information, indicating which direction inner cable member 108 is moving relative to outer cable housing 110 (e.g., whether knob 114a is being moved toward knob 114b or away from knob 114b).

Measuring device 104 is configured to send cable movement information (or measurement information), generated by encoders(s) 112, to computer system 106. Computer system 106, in turn, analyzes received cable movement information to determine one or more dimensions being measured with cable 102.

In some embodiments, measuring device 104 is configured to send raw encoder data (e.g., analog or digital pulses generated by encoder(s) 112) to computer system 106. Computer system 106 then converts the raw encoder data into length and time information. In other embodiments, measuring device 104 is configured to send length and time information to computer system 106 directly. It will be appreciated that it may be preferable for measuring device 104 to be constructed in a cheap and durable manner. As such, it may be preferable for measuring device 104 to send raw encoder data in order to simplify construction of measuring device 104.

Figure 2A:
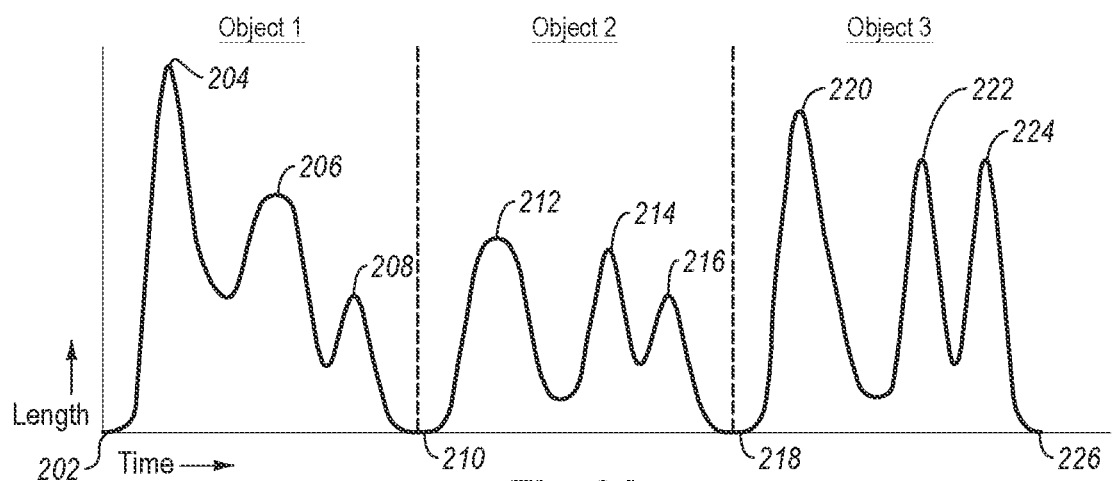
FIG. 2A illustrates a length versus time graph representing measurements of three different three-dimensional objects.
Figure 2B:
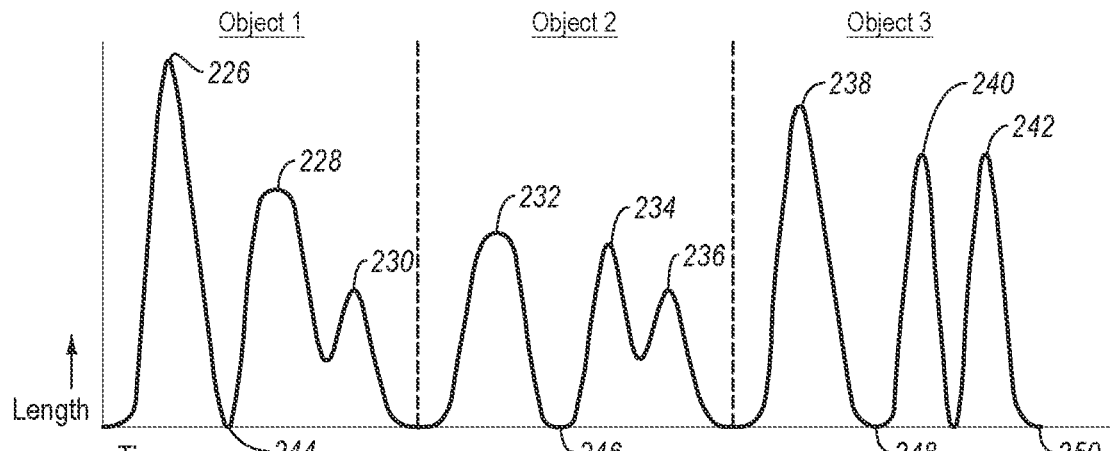
FIG. 2B illustrates a length versus time graph representing measurements of three different three-dimensional objects.
Figure 2C:
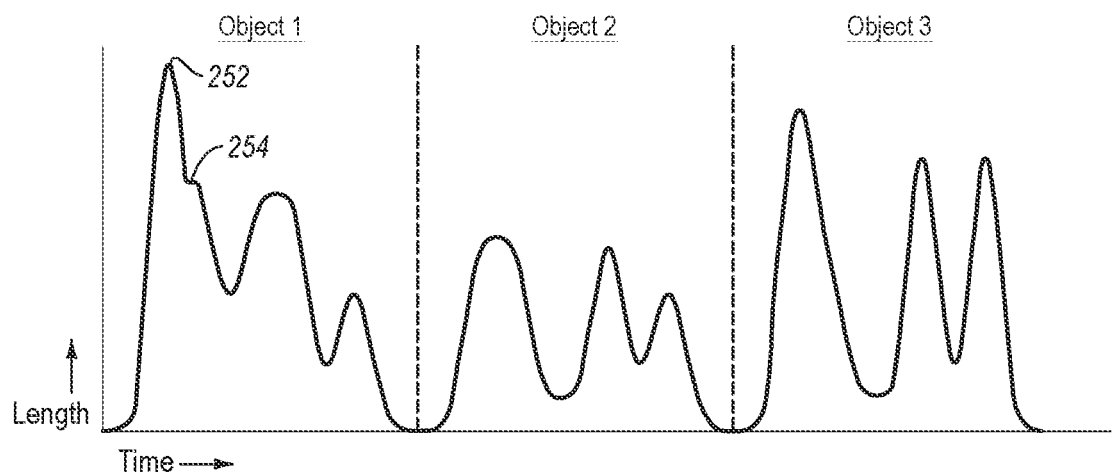
FIG. 2C illustrates a length versus time graph representing measurements of three different three-dimensional objects.

FIGS. 2A-2C illustrate exemplary length versus time graphs, each representing orthogonal dimensions of three different three-dimensional objects/groups of objects. In each of these figures, the Y (vertical) axis represents length (e.g., in imperial or metric units) and the X (horizontal) axis represents time. Thus, each graph of FIGS. 2A-2C shows the length of inner cable member 108 as it extends from and retracts into outer cable member 110 over time. In other words, each graph of FIGS. 2A-2C represent the distance between knob 114a and knob 114b (i.e., length 116) as a user positions the knobs over each orthogonal dimension of three different three-dimensional objects/groups of objects. At times, each three-dimensional object may actually include a plurality of objects, such as a bundle of objects. Thus, the length versus time graphs may represent orthogonal dimensions of at least one three-dimensional bundle of objects.

In some embodiments, each object can be recognized using peaks and zero points. Referring to FIG. 2A for example, computer system 106 may recognize zero point 202 as the beginning of a new object (Object 1), identify three dimensions of the object based on first peak 204, second peak 206, and third peak 208, and recognize zero point 210 as the end of Object 1 and possibly the beginning of a new object (e.g., Object 2). Object 2 may be identified based on peaks 212, 214, and 216 and zero points 210 and 218; Object 3 may be identified based on peaks 220, 222, and 224 and zero points 218 and 226.

Other dimensional identification algorithms are also possible. One such algorithm may identify three concurrent peaks as representing an object, without necessarily analyzing zero points. Referring to FIG. 2B for example, computer system 106 may recognize Object 1 based on the first set of three peaks (i.e., peaks 226, 228, and 230), recognize Object 2 based on the second set of three peaks (i.e., peaks 232, 234, and 236), and recognize Object 3 based on the third set of three peaks (i.e., peaks 238, 240, and 242). Note that while zero points 244, 246, 248, and 248 occur between peaks within corresponding objects, these zero points have no effect on determining whether objects begin or end. In some embodiments, however, a zero point held for a predefined amount of time (e.g., one second) may signal a reset, causing computer system 106 to recognize the beginning of a new object, the re-measurement of a dimension, etc.

Another dimensional identification algorithm may allow a plateau to override a peak or to signal the beginning or end of an object. In FIG. 2C, for example, plateau 254 may override peak 252. Overriding peaks with plateaus may be useful when a user has pulled too much inner cable length for a given dimensional measurement. In this circumstance, the user need only reduce the inner cable length to the object dimension and hold the length for a short time (e.g., one second) to generate a recognizable plateau.

While FIGS. 2A-2C have illustrated some exemplary dimensional identification algorithms, it will be appreciated that additional recognition steps can be used, such as the use of buttons, the use of spoken commands, the use of time delays, etc. Furthermore, combinations of any of the foregoing analytical techniques are also within the scope of this disclosure.

In some embodiments, one or more of measuring device 104 or computer system 106 may include input and feedback mechanisms which assist in measuring dimensions of physical objects. For example, measuring device 106 may include lights or buzzers which can be used to indicate measurement status (e.g., error conditions, the recognition of a dimension, the beginning of an object, the end of an object, etc.). Additionally or alternatively, computer system 106 may provide similar feedback via a computerized user interface. In addition, measuring device 104 and/or computer system 106 may provide buttons, switches, or user interface controls which enable a user to expressly signal the beginning or end of an object, to correct error conditions, or to provide any other appropriate user interactivity.

Computer system 106 is also configured to update a local or remote database with dimensional information. Once the dimensions of an object have been recognized by computer system 106, computer system 106 can add those dimensions to the database when appropriate. For example, computer system 106 may add a new entry for the object, or update an existing entry for the object. Each entry can contain the dimensional information.

Computer system 106 is also configured to initiate creation of physical box templates based on measured object dimensions. In particular, computer system 106 is configured to communicate with a material processing machine/system that creates (e.g., stamps or cuts) custom-sized box templates from raw (e.g., fanfold) material. In some embodiments, the material processing machine/system can create box templates on-demand. Examples of material processing machines/systems are disclosed in U.S. Pat. No. 6,840,898, issued Jan. 11, 2005, and entitled Apparatus for the Positioning of a Tool or a Tool Holder in a Machine Designed for Processing a Sheet Material, which is hereby incorporated herein by reference in its entirety.

Thus, cable-based measuring system 100 can enable a user to measure objects and add object dimensions to the database when appropriate by positioning cable members on each dimension of an object. For example, if a user is packaging a particular object, the user can identify the object with computer system 106 (e.g., through a bar code scan, a RFID scan, an item entry). If an entry for the object does not yet exist in the database, or if the information is incorrect or incomplete, the user can use cable 102 and measuring device 104 to measure the dimensions of the object. Computer system 106 can then update the database as appropriate, either automatically or with user-interaction. Computer system 106 can additionally or alternatively initiate creation of one or more custom-sized boxes for packaging the object (or like objects).

Figure 3A:
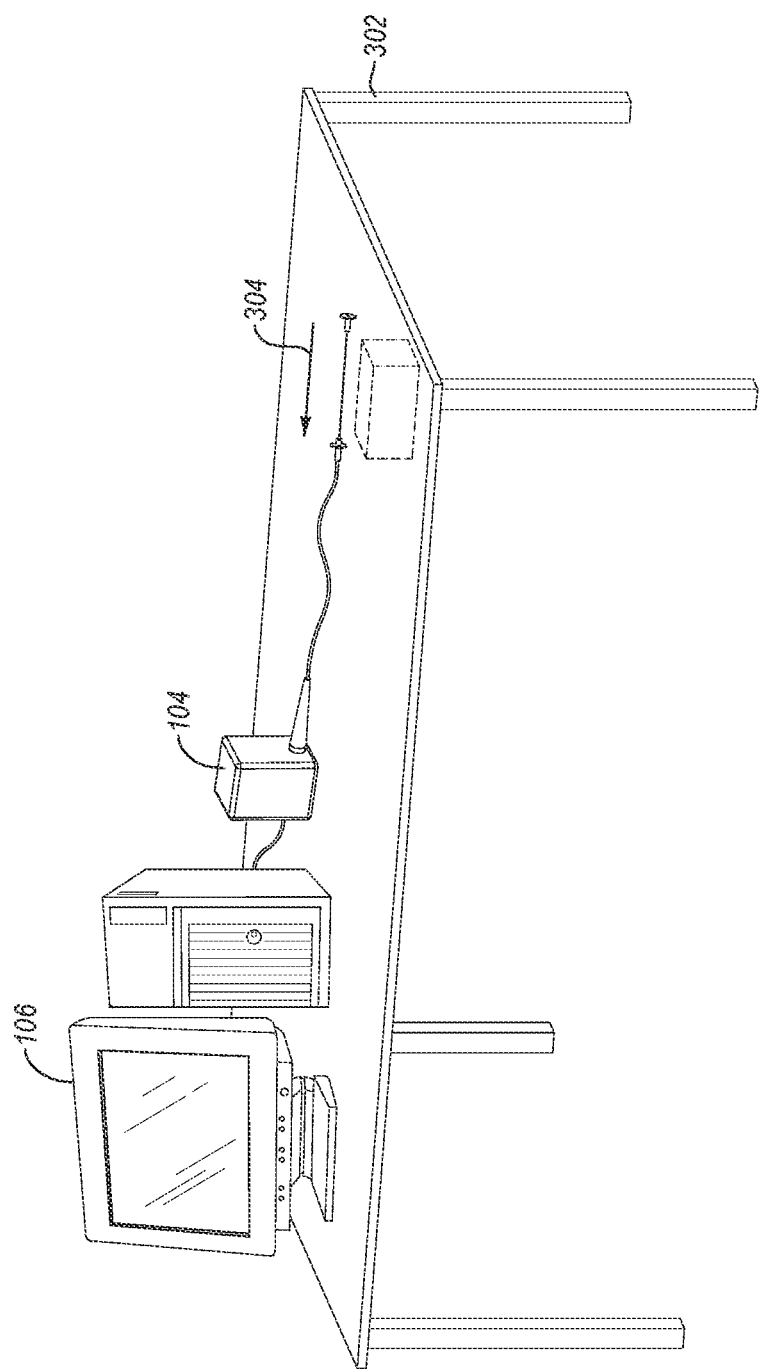
FIG. 3A illustrates an exemplary configuration of a cable-based measuring system.
Figure 3B:
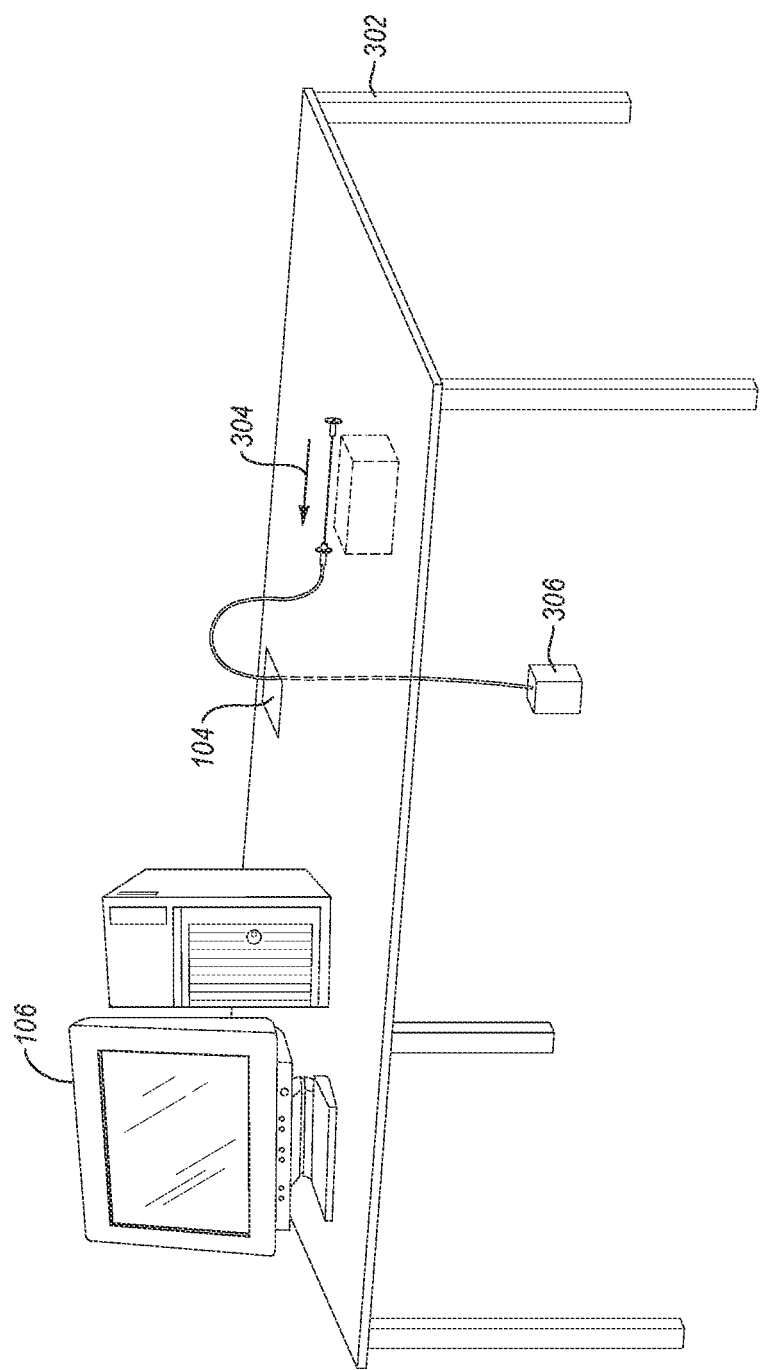
FIG. 3B illustrates an exemplary configuration of a cable-based measuring system.

FIGS. 3A and 3B illustrate exemplary configurations of cable-based measuring system 100. FIG. 3A, for example, illustrates that measuring device 104 may be used in connection with computer system 106 at workstation 302 (e.g., a table). Measuring device 104 can be embodied as a self-contained apparatus that can be placed on or near workstation 302. In some embodiments, measuring device 104 includes a mechanism configured to apply a force to inner cable member 108 which retracts inner cable member 108 through outer cable housing toward measuring device 104. For example, measuring device 104 may include a spool onto which a portion of inner cable member 108 is wound by a spring, motor, or other mechanism. Measuring device 104 therefore retracts inner cable member 108 onto the spool after a user has pulled an opposite end of inner cable member 108 from outer cable housing 110 to measure a dimension of an object (as indicated by arrow 304).

FIG. 3B illustrates an alternative embodiment in which measuring device 104 is incorporated into workstation 302. In the depicted embodiment, an end of outer cable housing 110 is mounted to measuring device 104, and inner cable member 108 passes through one or more encoders in measuring device 104. Counterweight 306 is attached to inner cable member 108. Counterweight 106 is configured to enable the force of gravity to retract inner cable member 108. Thus, after a user has pulled an opposite end of inner cable member 108 from outer cable housing 110 to measure a dimension of an object, counterweight 306 retracts that cable (as indicated by arrow 304).

FIG. 4 illustrates an exemplary computing environment 400 that facilitates identifying three-dimensional object measurements. Referring to FIG. 4, computing environment 400 includes measuring device 104, computer system 106, and database 408. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, computer system 106 includes communications component 402, analysis component 404, database component 406, user interaction component 410, and box template component 412. Communications component 204 is configured to receive measurement data/information from measuring device 104. Communications component 204 can be configured to receive raw encoder data from measuring device 104, and/or can be configured to receive more refined data (e.g., a length versus time data plot) from measuring device 104. The measurement data received by communications component 402 can include three-dimensional measurement information for one or more objects.

Analysis component 404 is configured to receive measurement data from communications component 402, and to perform appropriate processing and/or analysis on the measurement data. In some embodiments, analysis component 404 is configured to process raw encoder data to convert it into more refined data (e.g., length versus time data). Analysis component 404 performs analysis on the measurement data to determine the dimensions of one or more objects. For example, analysis component 404 may analyze data plots similar to those of FIGS. 2A-2C to ascertain the orthogonal dimensions (e.g., length, width, and height) of one or more objects represented by the measurement data.

Database component 406 is configured to update information in local and/or remote database 408. For example, after ascertaining the dimensions of an object, database component 406 can add the dimensions for that object in an entry in database 408, or can update an existing entry. Database component 406 can also be configured to retrieve dimensional information from database 408. For example, using user interaction component 408, a user can indicate that the dimensions of an object are desired. Database component 406 can then retrieve any existing information from database 408, or report that the information does not exist.

User interaction component 410 is configured to provide any appropriate user interface(s) to a user, and to enable user input from the user. For example, user interaction component 410 can be configured to enable a user to retrieve and update object dimension information, to perform measurement operations, to initiate creation of a box template (based on dimensional information stored in database 408 or based on new measurement information obtained with measuring device 104), etc.

Box template component 412 is configured to communicate with a material processing machine or system (not shown) to initiate creation of a box template that is appropriately sized to accommodate an object having dimensions represented by the measurement data. As such, box template component 412 can initiate the on-demand creation of custom boxes as objects are measured using measuring device 104.

Figure 5:
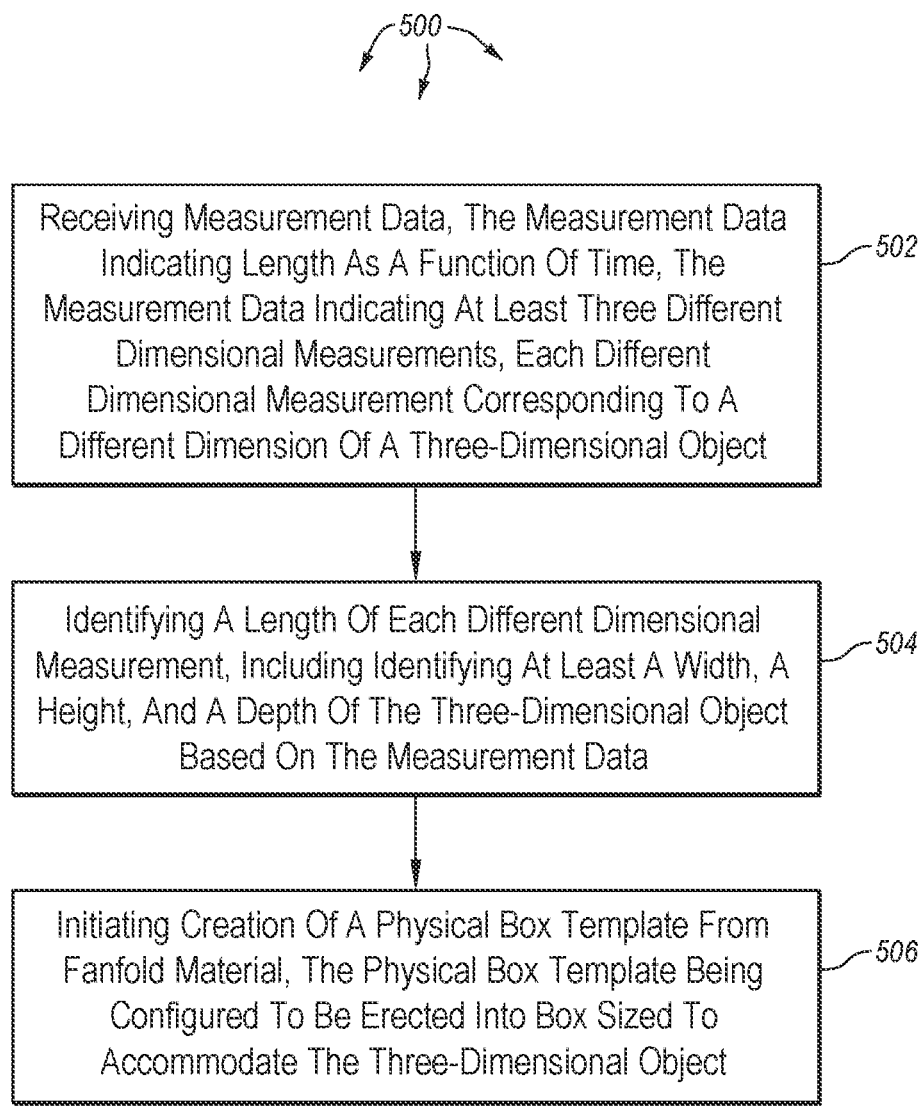
FIG. 5 illustrates a flow chart of an example method for identifying three-dimensional object measurements.

FIG. 5 illustrates a flow chart of an example method 500 for identifying three-dimensional object measurements. Method 500 will be described with respect to the components and data of computer architecture 400 and cable-based measuring system 100.

Method 500 includes an act of receiving measurement data, the measurement data indicating length as a function of time, the measurement data indicating at least three orthogonal dimensional measurements, each dimensional measurement corresponding to a dimension of a three-dimensional object (act 502). For example, communications component 402 can receive measurement data from measuring device 104, which is part of cable-based measuring system 100. The measurement data can comprise raw data from encoders (e.g., pulse information), or can contain more refined data (e.g., a length/time plot). As depicted in FIGS. 2A-2C, the measurement data can represent orthogonal dimensions of three-dimensional objects.

Method 500 also includes an act of identifying a length of each dimensional measurement, including identifying at least a length, a width, and a height of the three-dimensional object based on the measurement data (act 504). For example, analysis component 404 can analyze the received measurement data to identify dimensions of one or more objects. As discussed in connection with FIGS. 2A-2C, identification of object dimensions can be performed by identifying peaks, plateaus, zero points, etc. in the measurement data. The peaks, plateaus, zero points, etc. can result from movement by a user of inner cable member 108 relative to outer cable housing 108 of cable 102.

Method 500 also includes an act of the computer system performing one or both of: (i) initiating creation of a physical box template from raw material, the physical box template being configured to be erected into a box sized to accommodate the three-dimensional object, or (ii) updating a database, updating the database including one or more of: (i) creating an item entry for the three-dimensional object in the database, or (ii) updating an item entry for the three-dimensional object in the database (act 506). For example, box template component 412 can send object dimensions or template information to a material processing machine (not shown) to initiate creation of a physical box template from raw (e.g., fanfold) material. The physical box template, when assembled, is sized to accommodate the three-dimensional object that is represented by the measurement data. It will be appreciated that in some instances this may involve creating a physical box template having one or more dimensions that are larger than the three-dimensional object (e.g., to accommodate padding/filling materials).

Updating the database can include one or more of: (i) creating an item entry for the three-dimensional object in the database, or (ii) updating an item entry for the three-dimensional object in the database. The item entry can include one or more of: (i) an appropriate box size for the three-dimensional object and/or (ii) the identified length, a width, and a height of the three-dimensional object. For example, database component 406 can update database 408.

While the present invention has been described in the context of a cable based measuring device, other measuring devices may also be utilized. In some embodiments, for example, the measuring device comprises two handheld sensors. Each handheld sensor can be configured as one or both of a wireless transmitter and/or a wireless receiver. As each handheld transmitter/receiver sensor is held at an opposite end of an object dimension, the transmitter/receiver sensors can be used to wirelessly determine the length of the dimension. Measurement may be carried out wirelessly using various types of electromagnetic waves such as light (e.g., laser), radio waves (e.g., radar). Measurement may additionally or alternatively be carried out wirelessly using sound waves.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A measuring and packaging system, comprising:
a material processing machine configured to create custom-sized box templates; and
a measuring device, comprising:
a first handheld device, the first handheld device at least being configured to transmit a wireless signal;
a second handheld device, the second handheld device being selectively movable relative to the first handheld device at least being configured to receive a wireless signal; and
a communications mechanism, the communications mechanism being configured to communicate measurement information to the material processing machine or an intermediate computer system, the measurement information based on at least one calculated distance between the first handheld device and the second handheld device, the material processing machine or computer system being configured to initiate creation of a box template by the material processing machine sized to accommodate a particular three-dimensional object based on the measurement information.

2. The measuring and packaging system as recited in claim 1, wherein the computer system is further configured to update a database entry for the three-dimensional object with the measurement information.

3. The measuring and packaging system as recited in claim 1, wherein the first handheld device is configured to receive a wireless signal.

4. The measuring and packaging system as recited in claim 1, wherein the second handheld device is configured to transmit a wireless signal.

5. The measuring and packaging system as recited in claim 1, wherein the first handheld device is configured to transmit the wireless signal that comprises one or more electromagnetic waves.

6. The measuring and packaging system as recited in claim 5, wherein the one or more electromagnetic waves comprise light and/or radio waves.

7. The measuring and packaging system as recited in claim 1, wherein the first handheld device is configured to transmit the wireless signal that comprises one or more sound waves.

8. The measuring and packaging system as recited in claim 1, wherein the second handheld device is configured to receive the wireless signal that comprises one or more electromagnetic waves.

9. The measuring and packaging system as recited in claim 8, wherein the one or more electromagnetic waves comprise light and/or radio waves.

10. The measuring and packaging system as recited in claim 1, wherein the first handheld device is configured to receive the wireless signal that comprises one or more sound waves.

11. A measuring device, comprising:
a first handheld device, the first handheld device at least being configured to transmit a wireless signal;
a second handheld device, the second handheld device at least being configured to receive a wireless signal; and
a processor, the processor being configured to calculate measurement data indicating length as a function of time based on the movements of the first handheld device and the second handheld device and the receipt of wireless signals at that second handheld device, the measurement data indicating at least three orthogonal dimensional measurements, each dimensional measurement corresponding to a dimension of a three-dimensional object, the measurement data indicating at least:
a first peak at a first time;
a first minimum at a second time subsequent to the first time;
a second peak at a third time subsequent to the second time;
a second minimum at a fourth time subsequent to the third time; and
a third peak at a fifth time subsequent to the fourth time.

12. The measuring device as recited in claim 11, further comprising a communications mechanism, the communications mechanism being configured to communicate measurement data to a computer system, the computer system being configured to initiate creation of a box template sized to accommodate a particular three-dimensional object based on the measurement data.

13. The measuring device as recited in claim 11, wherein the measurement data indicates at least three orthogonal dimensional measurements for each of one or more three-dimensional objects, and wherein the processor is further configured to identify at least a length, a width, and a height for each of the one or more three-dimensional objects.

14. The measuring device as recited in claim 13, wherein the computer system identifying at least a length, a width, and a height for each of the one or more three-dimensional objects comprises identifying a zero point in the measurement data.

15. The measuring device as recited in claim 13, wherein the computer system identifying at least a length, a width, and a height for each of the one or more three-dimensional objects comprises identifying a plateau in the measurement data.

16. The measuring device as recited in claim 13, wherein the computer system identifying at least a length, a width, and a height for each of the one or more three-dimensional objects comprises identifying a time delay in the measurement data.

17. The measuring device as recited in claim 13, wherein the computer system identifying at least a length, a width, and a height for each of the plurality of three-dimensional objects comprises receipt of an express user command comprising one or more of a button press or a voice command.

18. The measuring device as recited in claim 11, wherein the computer system identifying a length of each dimensional measurement, comprises an act of identifying at least three peaks in the measurement data.

19. The measuring device as recited in claim 18, wherein the computer system identifying a length of each dimensional measurement further comprises identifying at least one plateau after a peak.

* * * * *